United States Patent Office 3,051,723
Patented Aug. 28, 1962

3,051,723
SYNTHESIS OF 3-INDOLEALKANOIC ACID COMPOUNDS
Henry E. Fritz, South Charleston, W. Va., assignor to Union Carbide Corporation, a corporation of New York
No Drawing. Filed June 27, 1961, Ser. No. 119,783
10 Claims. (Cl. 260—319)

This invention relates to an improved process for the production of 3-indolealkanoic acid compounds. More particularly, this invention relates to the production of alkali metal salts of 3-indolealkanoic acids by reacting a heterocyclic organic compound with an indole in the presence of a strong base and the subsequent conversion of the alkali metal salt to the corresponding 3-indolealkanoic acid.

The 3-indolealkanoic acid compounds that are produced by the process of this invention are represented by the formula:

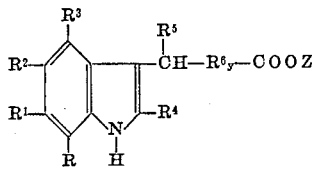

wherein each R, $R^1$, $R^2$, and $R^3$, when taken alone, can be a hydrogen atom, an alkyl radical having from 1 to about 8 carbon atoms, an alkoxy radical having from 1 to about 8 carbon atoms, an aryl radical having from 6 to about 8 carbon atoms, an aryloxy radical having from 6 to about 8 carbon atoms, a halogen atom, a benzamide radical, or an acetamide radical; $R^4$ can be a hydrogen atom, an alkyl radical having from 1 to about 8 carbon atoms, an alkoxy radical having from 1 to about 8 carbon atoms, an aryl radical having from 6 to about 8 carbon atoms, or an aryloxy radical having from 6 to about 8 carbon atoms; $R^5$ can be a hydrogen atom or an alkyl radical having from 1 to 9 carbon atoms; $R^6$ is an alkylene radical having from 1 to about 9 carbon atoms; the total number of carbon atoms in said $R^5$ and $R^6$ being no greater than 9; $y$ is a number having a value of 0 or 1; and Z can be an alkali metal atom or a hydrogen atom.

With reference to the groups designated as R, $R^1$, $R^2$, $R^3$, and $R^4$, the terms alkyl and alkoxy include alkyl and alkoxy groups that are substituted with aromatic radicals, such as benzyl, benzyloxy, and the like, and the terms aryl and aryloxy include aryl and aryloxy groups that are substituted with alkyl radicals, such as tolyl, xylyl, tolyloxy, xylyloxy, and the like.

The compounds that are produced by the process of this invention are conveniently represented in the free acid form by the formula:

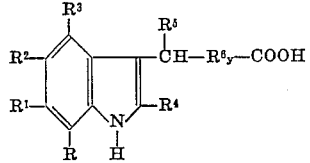

wherein R, $R^1$, $R^2$, $R^3$, $R^4$, $R^5$ and $R^6$, and $y$ are as previously defined. As examples of such compounds one can mention 3-indoleacetic acid, 2-(3-indolyl)propionic acid, 3-(3-indolyl)propionic acid, 2-(3-indolyl)butyric acid, 3-(3-indolyl)butyric acid, 4-(3-indolyl)butyric acid, 4-(3-indolyl)valeric acid, 2-(3-indolyl)-3-ethylpentanoic acid, 5-(3-indolyl)caproic acid, (3-[5-methyl]indolyl)acetic acid, (3-[6-methyl]indolyl)acetic acid, (3-[7-methyl]indolyl)acetic acid, the ethyl-substituted 3-indoleacetic acids, the propyl-substituted 3-indoleacetic acids, the butyl-substituted 3-indoleacetic acids, the pentyl-substituted 3-indoleacetic acids, the methyl-substituted 3-indolepropionic acids, the ethyl-substituted 3-indolepropionic acids, the propyl-substituted 3-indolepropionic acids, the butyl-substituted 3-indolepropionic acids, the pentyl-substituted 3-indolepropionic acids, the hexyl-substituted 3-indolepropionic acids, the methyl-substituted 3-indolebutyric acids, the ethyl-substituted 3-indolebutyric acids, the propyl-substituted 3-indolebutyric acids, the butyl-substituted 3-indolebutyric acids, the pentyl-substituted 3-indolebutyric acids, the hexyl-substituted 3-indolebutyric acids, (3-[2-methoxy]indolyl)acetic acid, (3-[4-methoxy]indolyl)acetic acid, (3-[5-methoxy]indolyl)acetic acid, (3-[6-methoxy]indolyl)acetic acid, (3-[7-methoxy]indolyl)acetic acid, the ethoxy-substituted 3-indoleacetic acids, the propoxy-substituted 3-indoleacetic acids, the pentoxy-substituted 3-indoleacetic acids, the hexoxy-substituted 3-indoleacetic acids, the methoxy-substituted 3-indolepropionic acids, the ethoxy-substituted 3-indolepropionic acids, the propoxy-substituted 3-indolepropionic acids, the butoxy-substituted 3-indolepropionic acids, the pentoxy-substituted 3-indolepropionic acids, the methoxy-substituted 3-indolebutyric acids, the ethoxy-substituted 3-indolebutyric acids, the propoxy-substituted 3-indolebutyric acids, the butoxy-substituted 3-indolebutyric acids, the pentoxy-substituted 3-indolebutyric acids, (3-[2-phenyl]indolyl)acetic acid, (3-[4-phenyl]indolyl)acetic acid, (3-[5-phenyl]indolyl)acetic acid, (3-[6-phenyl]indolyl)acetic acid, (3-[7-phenyl]indolyl)acetic acid, the phenyl-substituted 3-indolepropionic acids, the phenyl-substituted 3-indolebutyric acids, the phenoxy-substituted 3-indolealkanoic acids, 3-(3-[2-benzyl]indolyl)propionic acid, 3-(3-[4-benzyl]indolyl)propionic acid, 3-(3-[5-benzyl]indolyl)propionic acid, 3-(3-[6-benzyl]indolyl)propionic acid, 3-(3-[7-benzyl]indolyl)propionic acid, the benzyl-substituted 3-indolebutyric acids, the ethylphenyl-substituted 3-indolealkanoic acids, the tolyl-substituted 3-indolealkanoic acids, the xylyl-substituted 3-indolealkanoic acids, and the like, as well as acids substituted with several of the aforementioned groups such as 3-(3-[2-phenyl-7-methyl]indolyl)propionic acid, and the like, and the alkali metal salts thereof.

Acids of the type shown above can be used as intermediates in the preparation of biologically active compounds. For example, 3-(3-indolyl)propionic acid can be used to prepare lysergic acid, a useful pharmaceutical. The 3-indolealkanoic acids are also useful as plant growth regulators. For example, 4-(3-indolyl)butyric acid has been shown to effect the rooting of certain varieties of potato, sugar cane, carrots and grape vines; 6-(3-indolyl) caproic acid has been shown to have an activity similar to that of 4-(3-indolyl)butyric acid, while 3-(3-indolyl)propionic acid, 5-(3-indolyl)valeric acid and 7-(3-indolyl) heptanoic acid have also exhibited activity in this field.

Until the present invention, indolealkanoic acids, particularly those having carbon chains containing 4 or more carbon atoms exclusive of the carboxyl groups, have, as a group, been extremely difficult to synthesize. For example, the Fischer indole synthesis, which is the most common method known for the preparation of 3-indolealkanoic acids, involves a number of operations and requires starting materials that are difficult to prepare.

I have now discovered that alkali metal salts of 3-indolealkanoic acids can be prepared by a simple, one-step process which uses readily available starting materials, which salts are readily converted to the corresponding 3-indolealkanoic acids. The process is generally applicable to the preparation of a large class of 3-indolealkanoic acids and their alkali metal salts and is not restricted to only a single acid compound or to a narrow group of acid compounds. Furthermore, yields of 3-indolealkanoic acids of over 92 percent, and efficiencies of up to about 100 percent, based upon the indole employed, can be achieved in accordance with my process.

The process of this invention essentially comprises heating at elevated temperatures an indole represented by the formula:

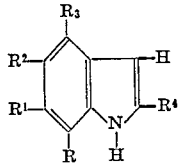

with a heterocyclic carbonyloxy-containing compound represented by the formula:

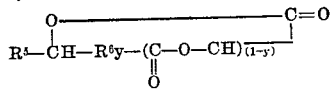

in the presence of a strong base, wherein R, $R^1$, $R^2$, $R^3$, $R^4$, $R^5$, $R^6$, and $y$ are as defined above.

Illustrative of the indoles that can be employed are indole, 2-methylindole, 4-methylindole, 5-methylindole, 6-methylindole, 7-methylindole, 2-ethylindole, 4-ethylindole, 5-ethylindole, 6-ethylindole, 7-ethylindole, the propylindoles, the butylindoles, the pentylindoles, the hexylindoles, the heptylindoles, 2-phenylindole, 4-phenylindole, 5-phenylindole, 6-phenylindole, 7-phenylindole, the methylphenylindoles, the ethylphenylindoles, the xylylindoles, the benzylindoles, the methoxyindoles, the ethoxyindoles, the aryloxy-substituted indoles, such as the phenoxyindoles, 4-chloroindole, 5-chloroindole, 6-chloroindole, 7-chloroindole, 4-bromoindole, 5-bromoindole, 6-bromoindole, 7-bromoindole, 4-benzamidoindole, 5-benzamidoindole, 6-benzamidoindole, 7-benzamidoindole, 4-acetamidoindole, 5-acetamidoindole, 6-acetamidoindole, 7-acetamidoindole as well as indoles substituted with various combinations of the above-related substituent groups, such as 2-phenyl-7-methylindole, and the like. Preferred compounds are those wherein the total number of carbon atoms contained in the substituents is less than about 11 carbon atoms.

The heterocyclic carbonyloxy-containing compounds that can be employed in the process of this invention are lactones represented by the formula:

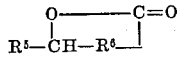

and lactides represented by the formula:

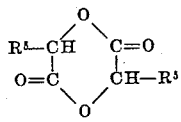

wherein $R^5$ and $R^6$ are as previously defined.

As examples of the heterocyclic carbonyloxy containing compounds which can be employed in the process of this invention one can mention beta-propiolactone,
alpha-methyl-beta-propiolactone,
beta-methyl-beta-propiolactone,
gamma-butyrolactone,
alpha-ethyl-beta-propiolactone,
beta-ethyl-beta-propiolactone,
alpha,alpha-dimethyl-beta-propiolactone,
alpha-methyl-gamma-butyrolactone,
beta-methyl-gamma-butyrolactone,
gamma-methyl-gamma-butyrolactone,
delta-valerolactone,
alpha-propyl-beta-propiolactone,
beta-propyl-beta-propiolactone,
alpha-ethyl-alpha-methyl-beta-propiolactone,
alpha-ethyl-beta-methyl-beta-propiolactone,
alpha-methyl-beta-ethyl-beta-propiolactone,
alpha,alpha,beta-trimethyl-beta-propiolactone,
alpha-ethyl-gamma-butyrolactone,
beta-ethyl-gamma-butyrolactone,
gamma-ethyl-gamma-butyrolactone,
alpha,alpha-dimethyl-gamma-butyrolactone,
beta,beta-dimethyl-gamma-butyrolactone,
alpha,beta-dimethyl-gamma-butyrolactone,
alpha,gamma-dimethyl-gamma-butyrolactone,
beta,gamma-dimethyl-gamma-butyrolactone,
alpha-methyl-delta-valerolactone,
beta-methyl-delta-valerolactone,
gamma-methyl-delta-valerolactone,
delta-methyl-delta-valerolactone,
epsilon-caprolactone,
alpha-butyl-beta-propiolactone,
beta-butyl-beta-propiolactone,
alpha,alpha-diethyl-beta-propiolactone,
alpha,beta-diethyl-beta-propiolactone,
alpha-methyl-alpha-propyl-beta-propiolactone,
alpha-propyl-beta-methyl-beta-propiolactone,
alpha-propyl-gamma-butyrolactone,
beta-propyl-gamma-butyrolactone,
gamma-propyl-gamma-butyrolactone,
alpha-methyl-alpha-ethyl-gamma-butyrolactone,
alpha-methyl-beta-ethyl-gamma-butyrolactone,
alpha-methyl-gamma-ethyl-gamma-butyrolactone,
alpha-ethyl-beta-methyl-gamma-butyrolactone,
alpha-ethyl-gamma-methyl-gamma-butyrolactone,
beta-methyl-beta-ethyl-gamma-butyrolactone,
beta-methyl-gamma-ethyl-gamma-butyrolactone,
beta-ethyl-gamma-methyl-gamma-butyrolactone,
alpha,alpha,beta-trimethyl-gamma-butyrolactone,
alpha,alpha,gamma-trimethyl-gamma-butyrolactone,
alpha,beta,beta-trimethyl-gamma-butyrolactone,
alpha,beta,gamma-trimethyl-gamma-butyrolactone,
beta,beta,gamma-trimethyl-gamma-butyrolactone,
alpha-ethyl-delta-valerolactone,
gamma-ethyl-delta-valerolactone,
delta-ethyl-delta-valerolactone,
alpha,alpha-dimethyl-delta-valerolactone,
alpha,beta-dimethyl-delta-valerolactone,
alpha,gamma-dimethyl-delta-valerolactone,
alpha,delta-dimethyl-delta-valerolactone,
beta,beta-dimethyl-delta-valerolactone,
delta,gamma-dimethyl-delta-valerolactone,
beta,delta-dimethyl-delta-valerolactone,
gamma,delta-dimethyl-delta-valerolactone,
alpha-methyl-epsilon-caprolactone,
beta-methyl-epsilon-caprolactone,
gamma-methyl-epsilon-caprolactone,
delta-methyl-epsilon-caprolactone,
epsilon-methyl-epsilon-caprolactone,
zeta-pimeolactone, the pentyl-substituted beta-propiolactones, the methylbutyl-substituted beta-propiolactones, the methyldiethyl-substituted beta-propiolactones, the dimethylpropyl-substituted beta-propiolactones, the dimethylpropyl-substituted beta-propiolactones, the dimethylpropyl-substituted beta-propiolactone, the ethylpropyl-substituted beta-propiolactone, the various 4-carbon atom substituted gamma-butyrolactones, the 3-carbon atom substituted delta-valerolactones, the ethyl- and di-methyl-substituted epsilon-caprolactones, the methyl-substituted zeta-pimeolactones, eta-capryllactone, the various nine carbon atom containing lactones, the various 10 carbon atom-containing lactones, such as iota-decanolactones, and the like, glycolide, lactide (3,6-dimethyl-2,5-p-dioxanedione), 3,6-diethyl-2,5-p-dioxanedione, 3,6-di-n-propyl-2,5-p-dioxanedione, 3,6-diisopropyl-2,5-p-dioxanedione, 3,6-di-n-butyl-2,5-p-dioxanedione, 3,6-di(2-methylpropyl) - 2,5 - p - dioxanedione, 3,6-di(3-methylpropyl)-2,5-p-dioxanedione, 3,6-diisobutyl-2,5-p-dioxanedione, and the like.

The amount of lactone employed in the initial reaction mixture is such that the molar ratio of lactone to the indole employed is from about 1.5:1 to about 1:1.5. Higher or lower ratios can be employed but are not necessary, since an excess of either reactant provides no particular advantages. Accordingly, equimolar ratios of lactone to indole are preferred.

When a lactide is employed in the process of this invention the molar ratio of lactide to indole is from about 0.25:1 to about 0.75:1. Higher and lower ratios can be employed but afford no particular advantages. A preferred ratio of lactide to indole is about 0.5 to 1.

The strong bases that are employed in the process of this invention are alkali metal hydroxides, alkali metal lower alkoxides, and alkali metal amides. Illustrative of such bases are lithium hydroxide, sodium hydroxide, potassium hydroxide, rubidium hydroxide, cesium hydroxide, sodium methoxide, sodium ethoxide, potassium methoxide, potassium ethoxide, sodamide, and the like. The alkali metal hydroxides are preferred.

In general, the mole ratio of base to lactone is from 1 to 1.5 moles of base per mole of lactone, with 1.1:1 to 1.5:1 preferred. Greater ratios can be employed but afford no particular advantages, whereas lower ratios result in reduced yields. Similarly, when the heterocyclic compound is a lactide, the mole ratio of base to lactide is from about 2:1 to 3:1, with 2.2:1 preferred.

The process of this invention can be conducted at temperatures of from about 150° C. to about 350° C. Temperatures in the range of from about 220° C. to about 300° C. are preferably employed.

In general, reaction times of ¼ to 100 hours can be employed. It is preferred, however, to employ times of from about 1 hour to about 20 hours.

The alkali metal salt produced as above can be converted readily to its corresponding acid by acidifying an aqueous solution of the salt to a pH of from about 1 to 7. Acids that can be employed include mineral acids, such as hydrobromic acid, hydrochloric acid, chloric acid, perchloric acid, nitric acid, sulphuric acid, phosphoric acid, and the like, and organic acids, such as formic acid, acetic acid, chloroacetic acid, propionic acid, and the like. Upon acidification of the aqueous solution of the alkali metal salt, the acid separates as a solid precipitate or as a water-immiscible phase. Where the acid forms as a solid it can be removed from the aqueous mixture by conventional methods, such as by filtration, centrifugation and the like, after which the indolealkanoic acid can be water-washed and dried at a temperature of from about 0° C. to about 100° C. or more, depending upon the melting point and decomposition temperature of the product.

Where the acid separates as a liquid phase it can be recovered by decantation or by solvent extraction processes, employing as solvents for the acid, aromatic hydrocarbons, such as benzene, toluene, xylene, ethylbenzene, alkylnaphthalenes and tetralin, ethers, such as isopropyl ether, aliphatic and alicyclic hydrocarbons, such as hexane, cyclohexane, and heptane, as well as halogenated solvents, such as chloroform and carbon tetrachloride. In general, the volumetric ratio of organic solvent to aqueous solution is from about 1:10 to about 10:1, although higher and lower ratios can be employed. The extraction can be effected by contacting the reaction mixture with an agitated mixture of water and the organic solvent or by first dissolving the reaction mixture in water and then extracting the aqueous solution with the organic solvent. The extraction can be conducted batchwise or continuously, according to conventional extraction procedures. After extraction, the organic phase can be distilled to strip off the solvent, recovering the indole as a bottoms product which can be recycled to the reaction if desired. The aqueous phase, containing the alkali metal 3-indolealkanoate, is then acidified and the 3-indolealkanoic acid is recovered by employing procedures similar to those previously described.

A preferred embodiment of the process of this invention comprises reacting an indole, a lactone and potassium hydroxide in molar ratios of about 1 mole of indole to from about 1 to about 1.1 moles of lactone and from about 1.1 to about 1.5 moles of potassium hydroxide at a temperature of from about 240° C. to about 270° C. for from about 1 hour to about twenty hours to produce a potassium indolealkanoate. The reaction mixture is then cooled to from about 20° C. to about 200° C. and mixed with from about 50 to about 200 moles of water per mole of potassium 3-indolealkanoate and is then extracted with isopropyl ether. The isopropyl ether extract is separated from the aqueous raffinate and is distilled to strip off the isopropyl ether. The indole remaining is recycled to the reaction. The aqueous raffinate is acidified with hydrochloric acid to a pH of about 1 to precipitate the 3-indolealkanoic acid, which is filtered out of the aqueous mixture, washed with water, and oven-dried.

Another procedure that can be employed is to conduct the above-described process in the presence of from about 1 to 2 moles of a solvent for the indole per mole of indole charged to the reaction. The solvent employed should be inert at the reaction conditions. Solvents containing hydroxyl groups, such as the alcohols, are to be avoided, because they will react with the indole, forming undesirable side products.

Suitable solvents include aliphatic hydrocarbons, such as octane and nonane, aromatic hydrocarbons, such as tetralin, alkylbenzenes, and alkylnaphthalenes, alicyclic hydrocarbons, such as decahydronaphthalene, and the like. Preferred solvents are those having from about 7 to about 10 carbon atoms.

After completion of the reaction, the reaction mixture is extracted with water to remove the alkali-metal 3-indolealkanoate and the solvent, containing unreacted indole, can be recycled to the reaction. The 3-indolealkanoic acid is recovered from the aqueous extracts, according to the procedures previously described.

The following examples are illustrative:

*Example 1*

There were charged to a one-liter, stainless steel, rocker autoclave 117 grams (1.0 mole) of indole, 90 grams (1.05 mole) of gamma-butyrolactone and 50 grams (1.25 moles) of sodium hydroxide. The resulting mixture was heated to a temperature of 245° C. over a period of one hour and maintained at 245±5° C. for 20 hours. After cooling to room temperature the solid brown sodium 4-(3-indolyl)butyrate that had formed was removed from the autoclave and dissolved in a mixture containing 500 milliliters of water and 240 milliliters of isopropyl ether. After separation of the resulting aqueous and organic phases, the aqueous, alkaline phase was extracted with two 100-milliliter portions of isopropyl ether. The three ether phases were combined and evaporated. The residue that remained contained 51 grams of indole. The ether-washed, aqueous solution was acidified with concentrated hydrochloric acid to a pH of 1, whereupon 4-(3-indolyl)butyric acid precipitated as a light tan-colored solid. The precipitated 4-(3-indolyl)butyric acid was then filtered from the aqueous solution, washed with water and dried. The crystals of 4-(3-indolyl)butyric acid thus obtained melted at a temperature of 118–122° C. and weighed 83 grams, representing a 40 percent yield of acid. The 4-(3-indolyl)butyric acid was identified by its infrared and ultraviolet spectra, and by a mixed melting point with a commercially obtainable sample of 4-(3-indolyl)butyric acid. The mixed melting point was 118–124.5° C. The commercial sample of 4-(3-indolyl)butyric acid melted at 124–125° C.

*Example 2*

There were charged to a one-liter, stainless steel rocker autoclave 117 grams (1.0 mole) of indole, 90 grams (1.05 moles) of gamma-butyrolactone and 70 grams (1.06 moles) of potassium hydroxide. The resulting mixture was heated at 280° C. to 290° C. for 19 hours. After cooling to ambient temperature the light brown-colored solid potassium 4-(3-indolyl)butyrate that had formed was removed from the autoclave and dissolved in one liter of water. The aqueous solution was extracted with two 250-milliliter portions of isopropyl ether. The ether extracts were combined and the ether was evaporated. A residue containing 24 grams of indole was recovered. The aqueous, ether-washed solution was acidified with concentrated hydrochloric acid to a pH of 2 and contacted with 250 milliliters of isopropyl ether, whereupon two liquid phases formed, a top, ether-rich phase and a lower aqueous phase, which were separated. The aqueous phase was extracted with 250 milliliters of isopropyl ether, after which the aqueous phase was discarded. The ether extract was combined with the ether extract obtained previously and washed with three 250 milliliter portions of water. The ether was evaporated and 188 grams of 4-(3-indolyl)butyric acid, representing a yield of about 92 percent, were recovered. The structure of the 4-(3-indolyl)butyric acid was confirmed by its infrared spectrum. The efficiency of this reaction, based upon indole, was 100 percent.

Example 3

There were charged to a one-liter flask, which was equipped with a stirrer, condenser and a thermometer, 335 grams (2.86 moles) of indole, 180 grams (2.1 moles) of gamma-butyrolactone and 100 grams (2.5 moles) of sodium hydroxide. The resulting mixture was heated to a temperature of 220° C. in one hour and then kept at 235° C.±15° C. for 12 hours. Stirring was started as soon as the mixture became fluid and was continued for the entire heating and reaction period. After cooling to room temperature the brown-colored solid sodium 4-(3-indolyl)butyrate that had formed was dissolved in a mixture containing one liter of water and 200 milliliters of isopropyl ether. After separation of the resulting aqueous and organic layers, the aqueous phase was washed with five 200-milliliter portions of isopropyl ether. The combined ether layers were filtered to remove a small quantity of insoluble material, washed with five 200-milliliter portions of water, and then the ether was evaporated, leaving 170 grams of indole as a residue. The aqueous layer was acidified with 8 percent hydrochloric acid to a pH of 1, whereupon tan-colored crystals of 4-(3-indolyl)butyric acid precipitated and were filtered out of the acidic, aqueous mixture. After drying three days in a vacuum desiccator the crystals weighed 220 grams, representing a 50 percent yield of 4-(3-indolyl)butyric acid. Recrystallization of the 4-(3-indolyl)butyric acid from water gave almost colorless crystals of 4-(3-indolyl)butyric acid that melted at 123.5–124.5° C. The structure of the compound was confirmed by infrared analysis.

Example 4

There were charged to a one-liter flask equipped with a stirrer, condenser, and thermometer, 235 grams (2.0 moles) of indole, 220 grams (2.2 moles) of delta-valerolactone and 140 grams (2.5 moles) of potassium hydroxide, which were reacted at a temperature of 240° C. for 20 hours. After cooling, the reaction mixture containing potassium 5-(3-indolyl)valerate was dissolved in approximately 1 liter of water. The resulting aqueous solution was extracted with a 500-milliliter portion and then a 250-milliliter portion of isopropyl ether. Combination and subsequent evaporation of the two isopropyl ether extracts permitted a recovery of 91 grams of unreacted indole. The aqueous, alkaline phase was acidified with concentrated hydrochloric acid to a pH of 1, whereupon crystals of 5-(3-indolyl)valeric acid separated as a brown-colored solid. After filtration from the acidic aqueous mixture, washing with water and drying, 186 grams of 5-(3-indolyl)valeric acid were obtained, representing a yield of 43 percent. After recrystallization of the 5-(3-indolyl)valeric acid from benzene the melting point of the acid was 107° C. The melting point of 5-(3-indolyl)valeric acid is reported by R. H. F. Manske and L. C. Leitch to be 105° C. (Canadian J. Research 14, 1–5 (1936)). The structure of the 5-(3-indolyl)valeric acid was confirmed by infrared and ultraviolet spectra and elemental analysis.

Example 5

There were charged to a one-liter, stainless steel, rocker autoclave 117 grams (1.0 mole) of indole, 130 grams (1.14 moles) of epsilon-caprolactone and 90 grams (1.6 moles) of potassium hydroxide. The resulting mixture was heated to a temperature of 250° C. in one hour and kept at a temperature of 250° C.±5° C. for 19 hours. After cooling to room temperature, the brown-colored solid potassium 6-(3-indolyl)caproate that had formed was removed from the autoclave and was dissolved in 1-liter of water. The resulting aqueous mixture was extracted with 250 milliliters of isopropyl ether. Evaporation of the isopropyl ether from the ether extract yielded a residue containing 3.0 grams of indole. The aqueous layer was acidified with concentrated hydrochloric acid to a pH of 1, whereupon 6-(3-indolyl)caproic acid separated as a tan-colored solid. After filtering the solids from the aqueous mixture, washing the solids with water and drying them in a vacuum desiccator, 198 grams of 6-(3-indolyl)caproic acid were obtained that melted at 136–141° C., representing an 85 percent yield of 6-(3-indolyl)caproic acid. Recrystallization of portions of the 6-(3-indolyl)caproic acid from acetic acid, benzene, methanol or hexane improved the melting point to 143–144° C. The structure of the 6-(3-indolyl)caproic acid was confirmed by infrared and ultraviolet spectra, elemental analysis and titration of the acidic function.

*Analysis.*—Calculated for $C_{14}H_{17}O_2N$: C, 72.8; H, 7.4; N, 6.1; nuetralization equivalent, 231.29. Found: C, 73.0; H, 8.1; N, 6.3; neutralization equivalent 228.

Example 6

There were charged to a one-liter, stainless steel autoclave 33 grams (0.16 mole) of 2-phenyl-7-methylindole, 25 grams (0.22 mole) of epsilon-caprolactone and 17 grams (0.255 mole) of potassium hydroxide. The resulting mixture was heated to a temperature of 240° C. in one hour and maintained at 245° C.±5° C. for 20 hours. The resulting reaction product containing potassium 6-(3-[2-phenyl-7-methyl]indolyl)caproate was dissolved in a mixture of 300 milliliters of water and 200 milliliters of isopropyl ether. The aqueous and organic layers that formed upon standing were separated and the aqueous phase was extracted with 200 milliliters of isopropyl ether. The combined ether layers were filtered to remove traces of solids, and the ether was evaporated leaving 11 grams of 2-phenyl-7-methylindole that melted at 186° C. to 188° C. The aqueous, alkaline layer was acidified with eight percent hydrochloric acid to a pH of 1 and the solid 6-(3-[2-phenyl-7-methyl]indolyl)caproic acid that precipitated was filtered from the aqueous solution and dried. The acid was soluble in isopropyl ether but insoluble in hexane. The 6-(3-[2-phenyl-7-methyl]indolyl)caproic acid was heated repeatedly with portions of approximately 100 milliliters of each of a 1:5 mixture by volume of isopropyl ether and hexane and the resulting hot layer of isopropyl ether-hexane mixture was decanted. The solid that remained was cooled, filtered and dried. The white crystals of 6-(3-[2-phenyl-7-methyl]indolyl)caproic acid thus recovered weighed 21.0 grams, amounting to a yield of 40 percent and melted at 97.5° C. to 99.5° C. The product structure was confirmed by infrared analysis.

Example 7

There were charged to a three-necked, one-liter, stainless steel flask, which was equipped with a stirrer, thermowell and a reflux condenser which had a trap for collecting the water of formation, 117 grams (1.0 mole) of indole, 100 grams (1.16 moles) of gamma-butyrolactone, 100 grams (1.5 moles) of potassium hydroxide and 250 grams of tetralin. The resulting mixture was heated to reflux with stirring in approximately one and one-half hours and maintained at reflux (210° C.) for ten hours, during which time a total of 36 milliliters of water were collected in the trap. After cooling and standing another eight hours, the resulting reaction mixture containing potassium 4-(3-indolyl)butyrate was combined with approximated one liter of water. The aqueous and organic layers that formed were separated. The upper organic layer weighed 269 grams and contained 11 percent by weight of unreacted indole, as determined by infrared analysis. The aqueous layer was acidified with concentrated hydrochloric acid to a pH of about two, whereupon 4-(3-indolyl)butyric acid separated as an oil which slowly crystallized. The crystals of 4-(3-indolyl)butyric acid, after filtering out of the aqueous mixture and drying, weighed 147 grams, representing a yield of about 70 percent. After recrystallization from benzene the 4-(3-indolyl)butyric acid melted at 123° C. to 125° C.

*Example 8*

A mixture of 93 grams (0.79 mole) of glycolide, 186 grams (1.6 moles) of indole and 132 grams (2.0 moles) of potassium hydroxide was heated at 250° C. under autogenous pressure for twenty-four hours in a one-liter, stainless steel flask. The mixture was then cooled to 90° C., and the solid potassium indoleacetate that had formed was dissolved in 300 milliliters of water. Unreacted indole (60 grams, 0.51 mole) was removed from the aqueous mixture by filtration and the filtrate was acidified with concentrated hydrochloric acid to a pH of 1. The light cream-colored crystals of 3-indoleacetic acid that had formed were recovered from the aqueous solution by filtration and dried. The dried crystals weighed 205 grams, amounting to a 74 percent yield of 3-indoleacetic acid, and had a melting point of 158° C. to 162° C., with decomposition.

*Example 9*

A charge containing 126 grams (1.1 moles) of epsilon-caprolactone, 117 grams (1.0 mole) of indole, and 162 grams (3.0 moles) of sodium methoxide was placed in a 3-liter, stainless steel, rocker autoclave. The reaction mixture was heated to 242° C. over a period of 1.25 hours and maintained at 240±2° C. for 20 hours. The reaction mixture was cooled to room temperature and the reaction product containing sodium 6-(3-indolyl)caproate was mixed with 2-liters of water and filtered to recover 75 grams of indole. The aqueous filtrate was acidified to a pH of 2 with concentrated hydrochloric acid, whereupon 6-(3-indolyl)caproic acid precipitated. After filtration from the acidic aqueous mixture and drying, the 6-(3-indolyl)caproic acid weighed 30 grams, representing a yield of 13 percent and an efficiency of 36 percent. Upon recrystallization from ethanol, there were obtained 14 grams of 6-(3-indolyl)caproic acid that melted at 140° C. to 143° C.

The structure of the product 6-(3-indolyl)caproic acid was confirmed by its infrared spectrum.

*Example 10*

There were charged to a 500-milliliter, three-necked Pyrex reaction flask, which was equipped with a stirrer, thermometer and reflux condenser, 117 grams (1.0 mole) of indole and 72 grams (1.0 mole) of propiolactone. The resulting mixture was heated slowly with stirring over a period of thirty minutes. At about 110° C. an exothermic reaction took place and the temperture rose rapidly to 181° C. The reaction mixture was then cooled to 120° C. and kept at this temperature for six hours. After cooling to ambient temperature, the dark mixture that had formed was contacted with 250 milliliters of iso- propyl ether and 400 milliliters of an aqueous 10 percent sodium hydroxide solution. The resulting aqueous and organic layers were separated and the aqueous alkaline layer was extracted with 100 milliliters of isopropyl ether. The two ether phases were combined and the ether was evaporated, leaving 101 grams of indole. The alkaline layer was acidified with aqueous 8 percent hydrochloric acid to a pH of 1 and an oil separated out. The resulting mixture was contacted with two 250-milliliter portions of isopropyl ether, leaving 10.0 grams of an insoluble oil. This water- and ether-insoluble oil was not identified other than to prove it was not 3-(3-indolyl)propionic acid by infrared analysis. The two 250-milliliter ether layers were combined and the ether was evaporated, leaving 15 grams of residue. This solid residue contained not more than one gram of 3-(3-indolyl)propionic acid based on its infrared spectrum. No attempt was made to purify this solid.

*Example 11*

There were charged to a one-liter, stainless steel rocker autoclave 117 grams (1.0 mole) of indole and 72 grams (1.0 mole) of propiolactone. The mixture was heated to 245° C. over a period of one hour, maintained at 245±5° C. for twenty hours, and then cooled to ambient temperature. The resulting reaction mixture was a hard, brown-colored resin-like material that was difficult to remove from the autoclave. This reaction mixture was contacted with two liters of an aqueous 10 percent sodium hydroxide solution and 200 milliliters of isopropyl ether. After separation of the aqueous and organic phases, the aqueous alkaline layer was extracted with five 200 milliliters portions of isopropyl ether. The several ether phases were combined, filtered, and evaporated, leaving 33 grams of a residue which was not indole but appeared to be some form of indole based on its infrared spectrum. The aqueous alkaline layer was acidified with aqueous eight percent hydrochloric acid to a pH of 1, whereupon a semi-solid was liberated which was not soluble in ether, benzene, or hexane. The semi-solid was isolated by decantation of the acid solution. After washing the insoluble material with water, the material was dried in a vacuum desiccator over a period of several days. The dried brown solid weighed 118 grams and was not identified except to confirm by infrared analysis that no 3-(3-indolyl)propionic acid was present.

What is claimed is:

1. In a process for producing a 3-indolealkanoic acid of the formula:

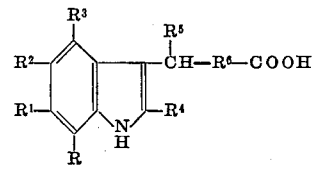

wherein each R, $R^1$, $R^2$, and $R^3$ is a member selected from the group consisting of a hydrogen atom, a halogen atom, alkyl of from 1 to 8 carbon atoms, alkoxy of from 1 to 8 carbon atoms, aryl of from 6 to 8 carbon atoms, aryloxy of from 6 to 8 carbon atoms, benzamide, and acetamide; $R^4$ is a member selected from the group consisting of a hydrogen atom, alkyl of from 1 to 8 carbon atoms, alkoxy of from 1 to 8 carbon atoms, aryl of from 6 to 8 carbon atoms, and aryloxy of from 6 to 8 carbon atoms; the number of carbon atoms contained by said R, $R^1$, $R^2$, $R^3$, and $R^4$ being less than 11; $R^5$ is a member selected from the group consisting of a hydrogen atom and alkyl of from 1 to 9 carbon atoms; $R^6$ is alkylene of from 1 to 9 carbon atoms; the total number of carbon atoms contained by said $R^5$ and $R^6$ being no greater than 9; and y is a member selected from the group consisting of 0 and 1, the step which comprises heating at 150° C. to 350° C. an indole of the formula:

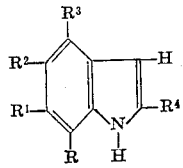

and a heterocyclic, carbonyloxy-containing compound of the formula:

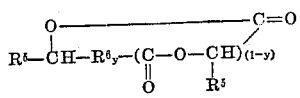

wherein R, $R^1$, $R^2$, $R^3$, $R^4$, $R^5$, $R^6$, and y are previously defined, with a sufficient amount of strong base selected from the group consisting of an alkali metal hydroxide, an alkali metal lower alkoxide, and an alkali metal amide to promote the reaction of said indole and said heterocyclic carbonyloxy-containing compound.

2. In a process for producing a 3-indolealkanoic acid of the formula:

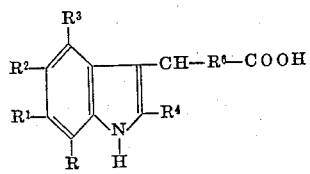

wherein each R, $R^1$, $R^2$, and $R^3$ is a member selected from the group consisting of a hydrogen atom, a halogen atom, alkyl of from 1 to 8 carbon atoms, alkoxy of from 1 to 8 carbon atoms, aryl of from 6 to 8 carbon atoms, aryloxy of from 6 to 8 carbon atoms, benzamide, and acetamide; $R^4$ is a member selected from the group consisting of a hydrogen atom, alkyl of from 1 to 8 carbon atoms, alkoxy of from 1 to 8 carbon atoms, aryl of from 6 to 8 carbon atoms, and aryloxy of from 6 to 8 carbon atoms; the number of carbon atoms contained by said R, $R^1$, $R^2$, $R^3$, and $R^4$ being less than 11; $R^5$ is a member selected from the group consisting of a hydrogen atom and alkyl of from 1 to 9 carbon atoms, and $R^6$ is alkylene of from 1 to 9 carbon atoms; the total number of carbon atoms contained by said $R^5$ and $R^6$ being no greater than 9, the step which comprises heating at 150° C. to 350° C. an indole of the formula:

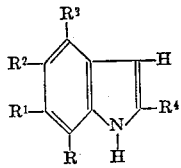

and a lactone of the formula:

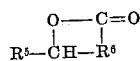

wherein R, $R^1$, $R^2$, $R^3$, $R^4$, $R^5$, and $R^6$ are as previously defined, with a sufficient amount of a strong base selected from the group consisting of an alkali metal hydroxide, an alkali metal lower alkoxide, and an alkali metal amide, to promote the reaction of said indole and said lactone.

3. The process as claimed in claim 2 wherein said lactone is gamma-butyrolactone.

4. The process as claimed in claim 2 wherein said lactone is delta-valerolactone.

5. The process as claimed in claim 2 wherein said lactone is epsilon-caprolactone.

6. The process as claimed in claim 2 wherein said indole is indole.

7. The process as claimed in claim 2 wherein said indole is 2-phenyl-7-methylindole.

8. In a process for producing a 3-indolealkanoic acid of the formula:

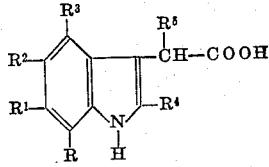

wherein each R, $R^1$, $R^2$, and $R^3$ is a member selected from the group consisting of a hydrogen atom, a halogen atom, alkyl of from 1 to 8 carbon atoms, alkoxy of from 1 to 8 carbon atoms, aryl of from 6 to 8 carbon atoms, aryloxy of from 6 to 8 carbon atoms, benzamide, and acetamide; R is a member selected from the group consisting of a hydrogen atom, alkyl of from 1 to 8 carbon atoms, alkoxy of from 1 to 8 carbon atoms, aryl of from 6 to 8 carbon atoms, and aryloxy of from 6 to 8 carbon atoms; the number of carbon atoms contained by said R, $R^1$, $R^2$, $R^3$, and $R^4$ being less than 11; and $R^5$ is a member selected from the group consisting of a hydrogen atom and alkyl of from 1 to 9 carbon atoms, the step which comprises heating at 150° C. to 350° C. an indole of the formula:

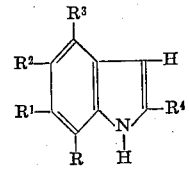

and a lactide of the formula:

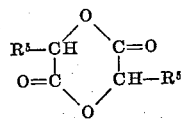

wherein R, $R^1$, $R^2$, $R^3$, $R^4$, and $R^5$ are as previously defined, with a sufficient amount of a strong base selected from the group consisting of an alkali metal hydroxide, an alkali metal lower alkoxide, and an alkali metal amide to promote the reaction of said indole and said lactide.

9. The process as claimed in claim 8 wherein said lactide is glycolide.

10. The process as claimed in claim 8 wherein said indole is indole.

References Cited in the file of this patent

Migrdichian, Organic Synthesis, volume 1, pages 335–339 (1957).

UNITED STATES PATENT OFFICE
CERTIFICATE OF CORRECTION

Patent No. 3,051,723            August 28, 1962

Henry E. Fritz

It is hereby certified that error appears in the above numbered patent requiring correction and that the said Letters Patent should read as corrected below.

Column 3, lines 15 to 18, the formula should appear as shown below instead of as in the patent:

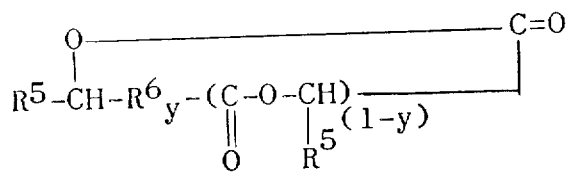

column 10, lines 51 to 57, the formula should appear as shown below instead of as in the patent:

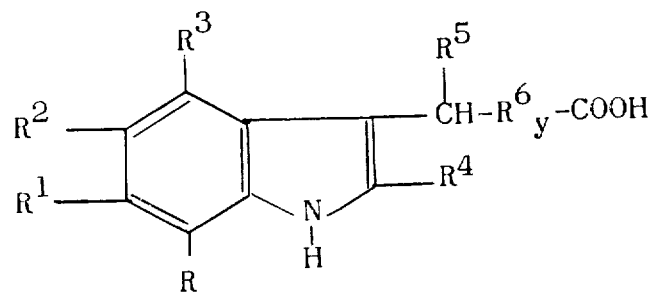

column 11, lines 24 to 31, the formula should appear as shown below instead of as in the patent:

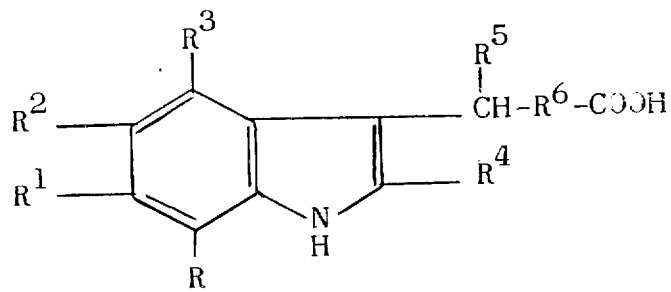

Signed and sealed this 16th day of April 1963.

(SEAL)
Attest:

ERNEST W. SWIDER            DAVID L. LADD
                                                         Commissioner of
Attesting Officer                       Patents